United States Patent
Nagai

(10) Patent No.: US 6,717,779 B2
(45) Date of Patent: Apr. 6, 2004

(54) MAGNETORESISTIVE HEAD AND MANUFACTURING METHOD THEREFOR

(75) Inventor: Atsuhiko Nagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 09/964,050

(22) Filed: Sep. 26, 2001

(65) Prior Publication Data

US 2002/0181173 A1 Dec. 5, 2002

(30) Foreign Application Priority Data

Jun. 1, 2001 (JP) ........................................ 2001-166274

(51) Int. Cl.⁷ ................................................. G11B 5/39
(52) U.S. Cl. ................................................. 360/324.12
(58) Field of Search ........................ 360/324.1, 324.11, 360/324.12, 324.2

(56) References Cited

U.S. PATENT DOCUMENTS 6,466,418 B1 * 10/2002 Horng et al. .......... 360/324.12
6,507,465 B1 * 1/2003 Nakamoto et al. .......... 360/322
6,535,363 B1 * 3/2003 Hosomi et al. .......... 360/324.1

* cited by examiner

Primary Examiner—David Ometz
(74) Attorney, Agent, or Firm—Greer, Burns & Crain, Ltd.

(57) ABSTRACT

A magnetoresistive head includes a first magnetic shield, an antiferromagnetic layer provided on the first magnetic shield, a pinned ferromagnetic layer provided on the antiferromagnetic layer, a nonmagnetic intermediate layer provided on the pinned ferromagnetic layer, and a free ferromagnetic layer provided on the nonmagnetic intermediate layer. The magnetoresistive head further includes a pair of hard magnetic film bias layers provided on the opposite sides of the free ferromagnetic layer, a pair of terminal layers provided on the hard magnetic film bias layers, a metal oxide film formed on the free ferromagnetic layer at an exposed portion between the pair of terminal layers, and a second magnetic shield provided on the pair of terminal layers and the metal oxide film.

10 Claims, 3 Drawing Sheets

MAGNETORESISTIVE HEAD AND MANUFACTURING METHOD THEREFOR

BACKGROUND OF THE INVENTION

1. Field of the Invention

The present invention relates to a magnetoresistive head for use in a magnetic recording device such as a magnetic disk drive and a magnetic tape drive, and more particularly to a spin valve magnetoresistive head.

2. Description of the Related Art

In association with a reduction in size and an increase in recording density of a magnetic disk drive in recent years, the flying height of a head slider has become smaller and it has been desired to realize contact recording/reproduction such that the head slider flies a very small height above a recording medium or comes into contact with the recording medium.

Further, a conventional magnetic induction head has a disadvantage such that its reproduction output decreases with a decrease in peripheral speed of a magnetic disk as the recording medium (relative speed between the head and the medium) caused by a reduction in diameter of the magnetic disk. To cope with this disadvantage, there has recently extensively been developed a magnetoresistive head (MR head) whose reproduction output does not depend on the peripheral speed and capable of obtaining a large output even at a low peripheral speed. Such a magnetoresistive head is now a dominating magnetic head. Further, a magnetic head utilizing a giant magnetoresistive (GMR) effect is also commercially available at present.

With higher-density recording in a magnetic disk drive, a recording area of one bit decreases and a magnetic field generated from the medium accordingly becomes smaller. The recording density of a magnetic disk drive currently on the market is about 20 Gbit/in$^2$, and it is rising at an annual rate of about 200%. It is therefore desired to develop a magnetoresistive head having a narrow core width and a large reproduction output which can support a minute magnetic field range and can sense a change in small external magnetic field.

At present, a spin valve magnetoresistive sensor utilizing a spin valve GMR effect is widely used in a magnetic head for a magnetic disk. In such a magnetoresistive sensor having a spin valve structure, a magnetization direction in a free ferromagnetic layer (free layer) is changed by a signal magnetic field from a recording medium, so that a relative angle of this magnetization direction to a magnetization direction in a pinned ferromagnetic layer (pinned layer) is changed, causing a change in resistance of the magnetoresistive sensor.

In the case of using this magnetoresistive sensor in a magnetic head, the magnetization direction in the pinned layer is fixed to a direction along the height of a magnetoresistive element, and the magnetization direction in the free layer in the condition where no external magnetic field is applied is generally designed to a direction along the width of the magnetoresistive element, which direction is perpendicular to the pinned layer. Accordingly, the resistance of the magnetoresistive sensor can be linearly increased or decreased according to whether the direction of the signal magnetic field from the magnetic recording medium is parallel or antiparallel to the magnetization direction of the pinned layer. Such a linear resistance change facilitates signal processing in the magnetic disk drive.

In a magnetoresistive sensor now in use, a sense current is passed in a direction parallel to the film surface of the magnetoresistive element to read a resistance change according to an external magnetic field. In such a case of a CIP (Current In the Plane) structure that a current is passed in a direction parallel to the GMR film surface, the output from the sensor decreases with a decrease in sense region (core width) defined by a pair of electrode terminals. Known as a magnetoresistive head capable of obtaining a large reproduction output with a narrow core width is a so-called terminal overlay type magnetoresistive head having such a structure that the spacing between a pair of terminal layers provided on the opposite sides of a GMR film is set smaller than the spacing between a pair of hard magnetic film bias layers provided beneath the terminal layers.

Further, it is known that a so-called specular type spin valve magnetoresistive head having an oxide film formed on a free layer to generate specular scattering is effective as a GMR element configuration for obtaining a large reproduction output. Further, it is also known that a so-called bottom type or reverse layered type magnetoresistive head having such a structure that a free layer is positioned farther than a pinned layer with respect to a slider substrate in layering a GMR element is advantageous from the viewpoint of efficiently utilizing a bias magnetic field of a bias layer to control a magnetic domain in the free layer.

However, in the case of forming a GMR element by combining all of the above-mentioned configurations, the following problems may arise. In a terminal overlay bottom type specular GMR, an oxide film is formed on a free layer, and a pair of terminal layers are formed on the oxide film in an overlay structure. Accordingly, a sense current supplied from a terminal to the GMR element does not efficiently flow to the GMR element or does not flow at all. Therefore, it is basically impossible to use this GMR element as a magnetoresistive head.

In a terminal overlay top type specular GMR, a free layer having an oxide film on the surface is positioned nearer than a pinned layer with respect to a slider substrate. In this GMR, a bias magnetic field cannot be efficiently applied to the free layer, so that Barkhausen jump is likely to occur. Accordingly, this GMR is not suitable for a magnetoresistive head. Further, in a conventional bottom type specular GMR having no terminal overlay structure, it is difficult to obtain a large reproduction output with a narrow core width.

SUMMARY OF THE INVENTION

It is therefore an object of the present invention to provide a magnetoresistive head which can obtain a large reproduction output with a narrow core width.

It is another object of the present invention to provide a manufacturing method for such a magnetoresistive head.

In accordance with an aspect of the present invention, there is provided a magnetoresistive head comprising a first magnetic shield; an antiferromagnetic layer provided on the first magnetic shield; a pinned ferromagnetic layer provided on the antiferromagnetic layer; a nonmagnetic intermediate layer provided on the pinned ferromagnetic layer; a free ferromagnetic layer provided on the nonmagnetic intermediate layer; a pair of hard magnetic film bias layers provided in spaced relationship with each other on the opposite sides of the free ferromagnetic layer; a pair of terminal layers provided on the pair of hard magnetic film bias layers, respectively; a metal oxide film formed on at least the free ferromagnetic layer at an exposed portion between the pair of terminal layers; and a second magnetic shield provided on the pair of terminal layers and the metal oxide film.

Each of the pair of hard magnetic film bias layers is in contact with one end of each of the antiferromagnetic layer, the pinned ferromagnetic layer, the nonmagnetic intermediate layer, and the free ferromagnetic layer. Preferably, the spacing between the pair of terminal layers is smaller than the spacing between the pair of hard magnetic film bias layers, and one end portion of each of the terminal layers is in electrical contact with the free ferromagnetic layer.

The metal oxide film is formed by oxidizing a metal layer preliminarily formed on the free ferromagnetic layer, after forming the pair of hard magnetic film bias layers and the pair of terminal layers. Alternatively, the metal oxide film may be formed by depositing a metal oxide film on the free ferromagnetic layer and the pair of terminal layers after forming the pair of hard magnetic film bias layers and the pair of terminal layers.

In accordance with another aspect of the present invention, there is provided a manufacturing method for a magnetoresistive head, comprising the steps of forming a first magnetic shield; forming an antiferromagnetic layer on the first magnetic shield; forming a pinned ferromagnetic layer on the antiferromagnetic layer; forming a nonmagnetic intermediate layer on the pinned ferromagnetic layer; forming a free ferromagnetic layer on the nonmagnetic intermediate layer; forming a metal layer on the free ferromagnetic layer; forming a pair of hard magnetic film bias layers in spaced relationship with each other on the opposite sides of the free ferromagnetic layer; forming a pair of terminal layers on the pair of hard magnetic film bias layers, respectively; oxidizing the metal layer to form a metal oxide layer; and forming a second magnetic shield on the pair of terminal layers and the metal oxide layer.

Alternatively, a metal oxide film may be formed on the free ferromagnetic layer and the terminal layers after forming the hard magnetic film bias layers and the terminal layers, without preliminary formation of the metal layer on the free ferromagnetic layer.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
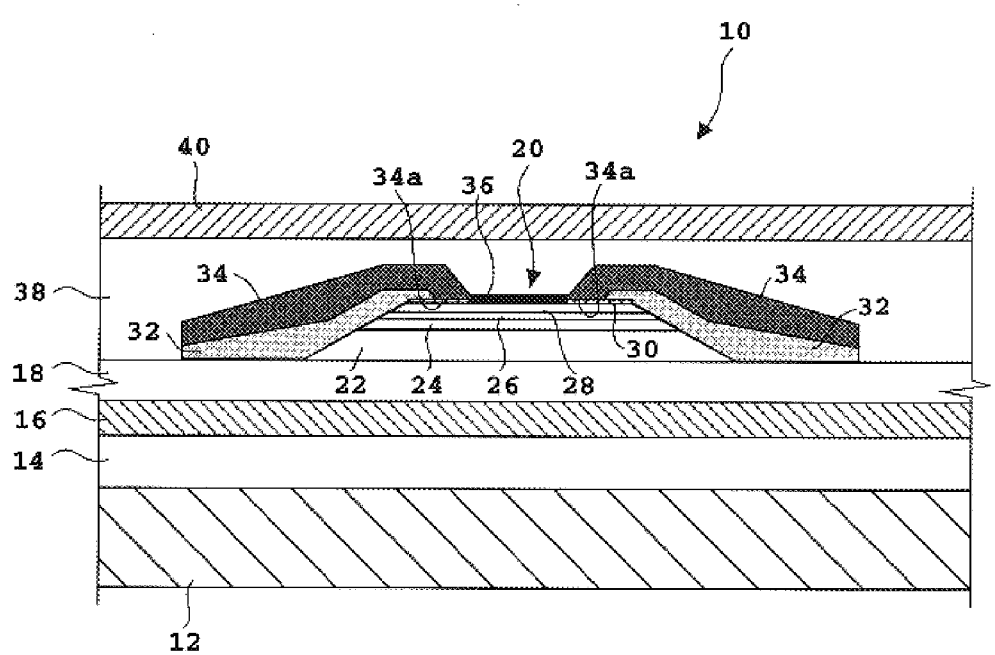
FIG. 1 is a sectional view of a magnetoresistive head according to a first preferred embodiment of the present invention.

Some preferred embodiments of the present invention will now be described with reference to the drawings. In the following description of all the preferred embodiments, substantially the same parts are denoted by the same reference numerals. Referring to FIG. 1, there is shown a sectional view of a spin valve magnetoresistive head 10 according to a first preferred embodiment of the present invention.

Reference numeral 12 denotes a slider substrate formed of $Al_2O_3$—TiC. A base layer 14 of $Al_2O_3$ is formed on the slider substrate 12. A lower magnetic shield 16 of NiFe is formed on the base layer 14. A first read gap 18 of $Al_2O_3$ is formed on the lower magnetic shield 16. A spin valve GMR film 20 is formed on the first read gap 18.

The spin valve GMR film 20 is composed of a PdPtMn antiferromagnetic layer 22 having a thickness of 15 nm, a CoFeB pinned ferromagnetic layer 24 having a thickness of 5 nm, a Cu nonmagnetic intermediate layer 26 having a thickness of 2 nm, a NiFe free ferromagnetic layer 28 having a thickness of 4 nm, and a Co or Fe metal layer 30 having a thickness of 3 nm. These layers 22, 24, 26, 28, and 30 are formed in this order from the read gap 18 side. The spin valve GMR film 20 has a substantially trapezoidal shape as shown in FIG. 1. A pair of hard magnetic film bias layers 32 are formed on the opposite sides of the spin valve GMR film 20. Each hard magnetic film bias layer 32 is formed of a high-coercivity material such as CoCrPt.

Since the spin valve GMR film 20 is trapezoidal in cross section, each hard magnetic film bias layer 32 is in contact with one end of each of the antiferromagnetic layer 22, the pinned ferromagnetic layer 24, the nonmagnetic intermediate layer 26, and the free ferromagnetic layer 28. A pair of terminal layers 34 are formed on the pair of hard magnetic film bias layers 32, respectively. Each terminal layer 34 is formed of Cu or the combination of Cu and Au, for example.

The hard magnetic film bias layers 32 are formed by applying a photoresist to the spin valve GMR film 20 and patterning the subject magnetic film. After forming the terminal layers 34, the photoresist is removed by a lift-off technique. There is a possibility that the photoresist may remain on the metal layer 30 as an uppermost layer of the spin valve GMR film 20. Accordingly, the spin valve GMR film 20 is preferably subjected to surface treatment by ion milling or the like to remove the remaining photoresist.

The spacing between the pair of terminal layers 34 is set smaller than the spacing between the pair of hard magnetic film bias layers 32. One end portion 34a of each terminal layer 34 is in electrical contact with the free ferromagnetic layer 28. In this preferred embodiment, the one end portion 34a of each terminal layer 34 is in contact with the metal layer 30. Thus, the magnetoresistive head 10 according to this preferred embodiment has such a structure that the spacing between the terminal layers 34 is set smaller than the spacing between the bias layers 32, so the magnetoresistive head 10 is referred to as a terminal overlay type magnetoresistive head.

After forming the bias layers 32 and the terminal layers 34, the substrate is moved into a vacuum chamber for film deposition, and oxygen is supplied into the vacuum chamber to oxidize a portion of the metal layer 30 exposed to the gap between the terminal layers 34, thereby forming a metal oxide layer 36 at this exposed portion of the metal layer 30. Thus, the exposed portion of the metal layer 30 is oxidized in the vacuum chamber to thereby allow easy formation of the specular film (metal oxide film) 36 on the free ferromagnetic layer 28. After forming the specular film 36 by oxidizing the metal layer 30, a second read gap 38 of $Al_2O_3$ is formed so as to cover the terminal layers 34 and the specular film 36. Further, an upper magnetic shield 40 of NiFe is formed on the second read gap 38 to complete the magnetoresistive head 10.

In actual, a composite magnetic head composed of the GMR element 20 and a write element is used as the magnetoresistive head 10. In manufacturing this composite magnetic head, an upper shield isolating layer of $Al_2O_3$ is formed on the upper magnetic shield 40, and a lower magnetic pole of NiFe or a high-permeability material is formed on the upper shield isolating layer. Further, a write gap of $Al_2O_3$ is formed on the lower magnetic pole, and a write coil is formed on the write gap. Finally, an upper magnetic pole of a high-permeability material is formed on the write coil, thus completing the composite magnetic head.

Figure 2:
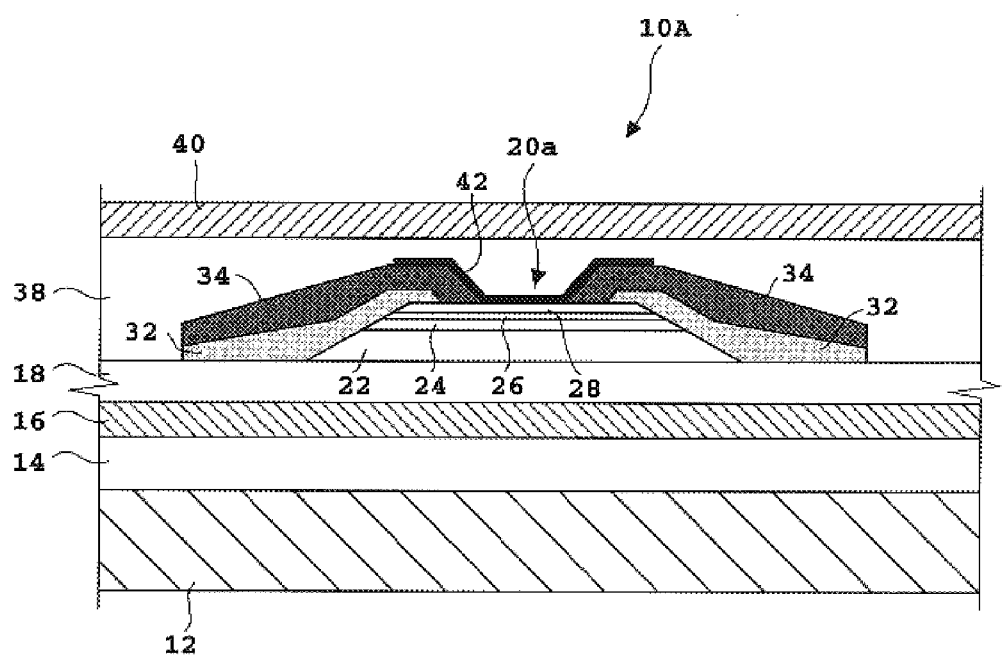
FIG. 2 is a sectional view of a magnetoresistive head according to a second preferred embodiment of the present invention.

Referring to FIG. 2, there is shown a sectional view of a magnetoresistive head 10A according to a second preferred embodiment of the present invention. The magnetoresistive head 10A includes a spin valve GMR film 20a. The spin valve GMR film 20a is composed of an antiferromagnetic layer 22, a pinned ferromagnetic layer 24, a nonmagnetic intermediate layer 26, and a free ferromagnetic layer 28. As similar to the first preferred embodiment, a pair of hard magnetic film bias layers 32 are formed on the spin valve GMR film 20a, and a pair of terminal layers 34 are formed on the pair of bias layers 32 (terminal overlay step). After the terminal overlay step, the substrate is moved into a vacuum chamber with no supply of oxygen to form a metal oxide film (specular film) 42 of $Fe_2O_3$ or CoO on the free ferromagnetic layer 28 at its exposed top portion between the pair of terminal layers 34 and on the pair of terminal layers 34 at their portions near the exposed top portion of the free ferromagnetic layer 28. Thereafter, an $Al_2O_3$ gap layer 38 is formed in the vacuum chamber.

In this manner, a specular film can be formed on a free layer by simply adding the step of forming the metal oxide film 42 to the conventional GMR element forming process. Of course, a metal film may be formed in an atmosphere of oxygen instead of formation of the metal oxide film. Also in this case, a similar film configuration can be formed.

Figure 3:
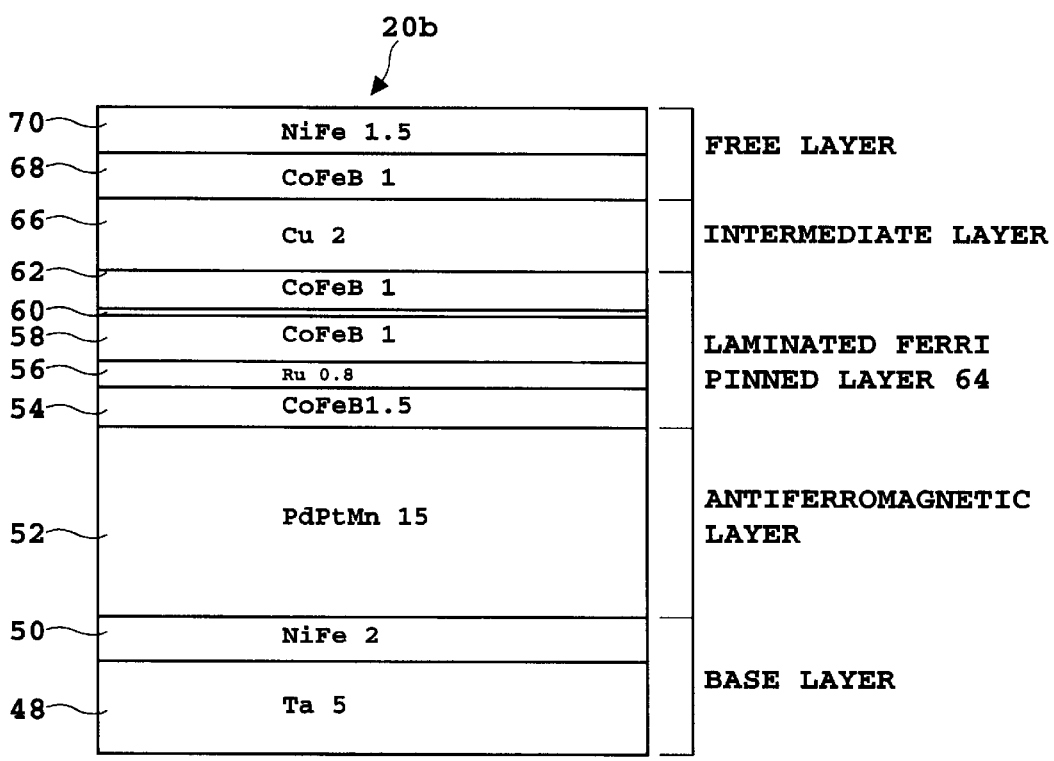
FIG. 3 is a sectional view of a GMR film used in a magnetoresistive head according to a third preferred embodiment of the present invention.

Referring to FIG. 3, there is shown a configuration of a GMR film 20b used in a magnetoresistive head (not shown) according to a third preferred embodiment of the present invention. The magnetoresistive head according to the third preferred embodiment is similar to that according to the first or second preferred embodiment except the GMR film 20b. A Ta layer 48 having a thickness of 5 nm is formed by sputtering on a read gap layer 18 as shown in FIG. 1 or 2. All the layers to be described below are also formed by sputtering.

A NiFe layer 50 having a thickness of 2 nm is formed on the Ta layer 48. The Ta layer 48 and the NiFe layer 50 constitute a base layer. A PdPtMn layer 52 having a thickness of 15 nm as an antiferromagnetic layer is formed on the NiFe layer 50. A CoFeB layer 54 having a thickness of 1.5 nm is formed on the PdPtMn layer 52. A Ru layer 56 having a thickness of 0.8 nm is formed on the CoFeB layer 54, and a CoFeB layer 58 having a thickness of 1 nm is formed on the Ru layer 56. A very thin specular film 60 is formed on the CoFeB layer 58 by oxidation of CoFeB, and a CoFeB layer 62 having a thickness of 1 nm is formed on the specular film 60.

The CoFeB layers 54, 58, and 62 separated by the Ru layer 56 constitute a laminated ferri pinned layer 64. Further, the pinned layer 64 serves also as a laminated ferri specular film. A Cu layer 66 having a thickness of 2 nm as a nonmagnetic intermediate layer is formed on the CoFeB layer 62. A CoFeB layer 68 having a thickness of 1 nm is formed on the Cu layer 66, and a NiFe layer 70 having a thickness of 1.5 nm is formed on the CoFeB layer 68. The CoFeB layer 68 and the NiFe layer 70 constitute a free ferromagnetic layer.

Further, a metal oxide film (specular film) 36 or 42 as shown in FIG. 1 or 2 is formed on the free layer of the spin valve GMR film 20b. Thus, the first specular film is formed in the pinned layer 64, and the second specular film is formed on the free layer of the spin valve GMR film 20b. Accordingly, the spin valve GMR film 20b has a double-specular type spin valve film configuration. Further, a pair of hard magnetic film bias layers 32 and a pair of terminal layers 34 as shown in FIG. 1 or 2 are formed on the spin valve GMR film 20b. Further, a lower magnetic shield 16 and an upper magnetic shield 40 as shown in FIG. 1 or 2 are also similarly formed.

According to this preferred embodiment employing the double-specular type spin valve GMR film 20b, a regeneration output can be further improved as maintaining a narrow core width as described in the first or second preferred embodiment. According to the present invention as described above, it is possible to provide a magnetoresistive head which can obtain a large reproduction output with a narrow core width.

What is claimed is:

1. A magnetoresistive head comprising:
   a first magnetic shield;
   an antiferromagnetic layer provided on the first magnetic shield;
   a pinned ferromagnetic layer provided on the antiferromagnetic layer;
   a nonmagnetic intermediate layer provided on the pinned ferromagnetic layer;
   a free ferromagnetic layer provided on the nonmagnetic intermediate layer;
   a pair of hard magnetic film bias layers provided in spaced relationship with each other on the opposite sides of the free ferromagnetic layer;
   a pair of terminal layers provided on the pair of hard magnetic film bias layers, respectively;
   a metal oxide film formed on at least the free ferromagnetic layer at an exposed portion between the pair of terminal layers; and
   a second magnetic shield provided on the pair of terminal layers and the metal oxide film;
   wherein the metal oxide film is formed by depositing the metal oxide film on the free ferromagnetic layer and the pair of terminal layers after forming the pair of hard magnetic film bias layers and the pair of terminal layers.

2. A magnetoresistive head according to claim 1, wherein each of the pair of hard magnetic film bias layers is in contact with one end of each of the antiferromagnetic layer, the pinned ferromagnetic layer, the nonmagnetic intermediate layer, and the free ferromagnetic layer.

3. A magnetoresistive head according to claim 1, wherein the pinned ferromagnetic layer comprises a laminated ferri specular film.

4. A magnetoresistive head comprising:
   a first magnetic shield;
   an antiferromagnetic layer provided on the first magnetic shield;
   a pinned ferromagnetic layer provided on the antiferromagnetic layer;
   a nonmagnetic intermediate layer provided on the pinned ferromagnetic layer;
   a free ferromagnetic layer provided on the nonmagnetic intermediate layer;
   a pair of hard magnetic film bias layers provided in spaced relationship with each other on the opposite sides of the free ferromagnetic layer;

a pair of terminal layers provided on the pair of hard magnetic film bias layers, respectively;

a metal layer formed on at least the free ferromagnetic layer at an exposed portion between the pair of terminal layers;

a metal oxide film formed on at least a portion of the metal layer; and a second magnetic shield provided on the pair of terminal layers and the metal oxide film;

wherein the spacing between the pair of terminal layers is smaller than the spacing between the pair of hard magnetic film bias layers, and one end portion of each of the terminal layers is in electrical contact with the free ferromagnetic layer, and wherein the metal oxide film is formed by oxidizing the metal layer preliminarily formed on the free ferromagnetic layer, after forming the pair of hard magnetic film bias layers and the pair of terminal layers.

5. A manufacturing method for a magnetoresistive head, comprising the steps of:

forming a first magnetic shield;

forming an antiferromagnetic layer on the first magnetic shield;

forming a pinned ferromagnetic layer on the antiferromagnetic layer;

forming a nonmagnetic intermediate layer on the pinned ferromagnetic layer;

forming a free ferromagnetic layer on the nonmagnetic intermediate layer;

forming a metal layer on the free ferromagnetic layer;

forming a pair of hard magnetic film bias layers in spaced relationship with each other on the opposite sides of the free ferromagnetic layer;

forming a pair of terminal layers on the pair of hard magnetic film bias layers, respectively;

oxidizing a first portion of the metal layer corresponding to an exposed portion between the terminal layers to form a metal oxide layer adjacent at least one remaining portion of the metal layer; and forming a second magnetic shield on the pair of terminal layers and the metal oxide layer.

6. A manufacturing method for a magnetoresistive head according to claim 5, wherein the spacing between the pair of terminal layers is smaller than the spacing between the pair of hard magnetic film bias layers, and one end portion of each of the terminal layers is in electrical contact with the free ferromagnetic layer.

7. A manufacturing method for a magnetoresistive head, comprising the steps of:

forming a first magnetic shield;

forming an antiferromagnetic layer on the first magnetic shield;

forming a pinned ferromagnetic layer on the antiferromagnetic layer;

forming a nonmagnetic intermediate layer on the pinned ferromagnetic layer;

forming a free ferromagnetic layer on the nonmagnetic intermediate layer;

forming a pair of hard magnetic film bias layers in spaced relationship with each other on the opposite sides of the free ferromagnetic layer;

forming a pair of terminal layers on the pair of hard magnetic film bias layers, respectively;

forming a metal oxide film on the free ferromagnetic layer and the pair of terminal layers; and forming a second magnetic shield on the metal oxide film.

8. A manufacturing method for a magnetoresistive head according to claim 7, wherein the spacing between the pair of terminal layers is smaller than the spacing between the pair of hard magnetic film bias layers, and one end portion of each of the terminal layers is in electrical contact with the free ferromagnetic layer.

9. A magnetoresistive head comprising:

a first magnetic shield;

an antiferromagnetic layer provided on the first magnetic shield;

a pinned ferromagnetic layer provided on the antiferromagnetic layer;

a nonmagnetic intermediate layer provided on the pinned ferromagnetic layer;

a free ferromagnetic layer provided on the nonmagnetic intermediate layer;

a pair of hard magnetic film bias layers provided in spaced relationship with each other on the opposite sides of the free ferromagnetic layer;

a pair of terminal layers provided on the pair of hard magnetic film bias layers, respectively;

a metal layer formed on at least the free ferromagnetic layer at an exposed portion between the pair of terminal layers, the metal layer having a first portion corresponding to the exposed portion and at least one remaining portion;

a metal oxide film formed on the first portion of the metal layer; and a second magnetic shield provided on the pair of terminal layers and the metal oxide film.

10. A magnetoresistive head according to claim 9, wherein the spacing between the pair of terminal layers is smaller than the spacing between the pair of hard magnetic film bias layers, and one end portion of each of the terminal layers is in electrical contact with the free ferromagnetic layer.

* * * * *